United States Patent
Singh et al.

(10) Patent No.: US 11,200,091 B2
(45) Date of Patent: Dec. 14, 2021

(54) ADAPTIVE MEMORY OPTIMIZATION FOR THIN CLIENTS

(71) Applicant: Dell Products L.P., Round Rock, TX (US)

(72) Inventors: Vishal Kumar Singh, Bangalore (IN); Mohammed Sarfraz, Bangalore (IN)

(73) Assignee: DELL PRODUCTS L.P., Round Rock, TX (US)

(*) Notice: Subject to any disclaimer, the term of this patent is extended or adjusted under 35 U.S.C. 154(b) by 110 days.

(21) Appl. No.: 16/780,055

(22) Filed: Feb. 3, 2020

(65) Prior Publication Data
US 2021/0240534 A1    Aug. 5, 2021

(51) Int. Cl.
*G06F 9/50* (2006.01)
*G06F 9/455* (2018.01)
(Continued)

(52) U.S. Cl.
CPC ............ *G06F 9/5016* (2013.01); *G06F 9/455* (2013.01); *G06F 9/45533* (2013.01); *G06F 9/45558* (2013.01); *G06F 9/48* (2013.01); *G06F 9/485* (2013.01); *G06F 9/4806* (2013.01); *G06F 9/4843* (2013.01); *G06F 9/4881* (2013.01); *G06F 9/4893* (2013.01); *G06F 9/50* (2013.01); *G06F 9/505* (2013.01); *G06F 9/5005* (2013.01); *G06F 9/5022* (2013.01); *G06F 9/5027* (2013.01); *G06F 9/5044* (2013.01); *G06F 9/5061* (2013.01); *G06F 9/5077* (2013.01); *G06F 9/5083* (2013.01); *G06F 9/5094* (2013.01); *G06F 9/542* (2013.01);
(Continued)

(58) Field of Classification Search
CPC .. G06F 9/455; G06F 9/45533; G06F 9/45558; G06F 2009/45583; G06F 9/48; G06F 9/4806; G06F 9/4843; G06F 9/485; G06F 9/4881; G06F 9/4893; G06F 9/50; G06F 9/5005; G06F 9/5011; G06F 9/5016; G06F 9/5022; G06F 9/5027; G06F 9/5044; G06F 9/505; G06F 9/5061; G06F 9/5077; G06F 9/5083; G06F 9/5094; G06F 9/542; G06F 11/3037; G06F 12/023
See application file for complete search history.

(56) References Cited

U.S. PATENT DOCUMENTS

| | | | |
|---|---|---|---|
| 2009/0006801 A1* | 1/2009 | Shultz | G06F 12/0653 711/170 |
| 2013/0174149 A1* | 7/2013 | Dasgupta | G06F 9/5072 718/1 |

(Continued)

*Primary Examiner* — Charles M Swift
(74) *Attorney, Agent, or Firm* — Kirton McConkie; Brian Tucker

(57) ABSTRACT

A memory optimizer service can be used to provide adaptive memory optimization. The memory optimizer service can be executed on a thin client or other user device to detect when low memory conditions exist. When it detects a low memory condition, the memory optimizer service can obtain process memory information for processes executing on the thin client and use the process memory information to calculate a trim amount to apply to the working set of processes with the highest amount of private bytes in their working sets. These trim amounts can be proportional to the amounts of private bytes and in sum can equal a total desired reduction in memory consumption.

20 Claims, 7 Drawing Sheets

(51) Int. Cl.
*G06F 9/48* (2006.01)
*G06F 11/30* (2006.01)
*G06F 9/54* (2006.01)
*G06F 12/02* (2006.01)

(52) U.S. Cl.
CPC ........ *G06F 11/3037* (2013.01); *G06F 12/023* (2013.01); *G06F 2009/45583* (2013.01)

(56) References Cited

U.S. PATENT DOCUMENTS

| | | | |
|---|---|---|---|
| 2015/0143364 A1* | 5/2015 | Anderson | G06F 9/45558 718/1 |
| 2016/0055023 A1* | 2/2016 | Ghosh | G06F 9/45558 718/1 |
| 2017/0235596 A1* | 8/2017 | Vankadaru | G06F 9/45558 718/1 |
| 2018/0144263 A1* | 5/2018 | Saxena | G06F 9/542 |
| 2019/0065239 A1* | 2/2019 | Ninomiya | G06F 12/08 |

* cited by examiner

(4a) Memory optimizer service 120 identifies processes with the highest private bytes

(4b) Memory optimizer service 120 calculates trim amounts for the identified processes

Memory Optimizer Service
120

| Process Name | Working Set | Private Bytes in Working Set | PID | Calculated Trim Amount (MB) |
|---|---|---|---|---|
| Process A | 500 | (350) | 123 | 12.5 |
| Process B | 350 | 200 | 321 | |
| Process C | 650 | (500) | 234 | 17.9 |
| Process D | 700 | (450) | 345 | 16.1 |
| Process E | 1500 | (1250) | 456 | 44.6 |
| Process F | 350 | (250) | 567 | 8.9 |
| Process G | 150 | 75 | 678 | |
| Process H | 99 | 69 | 789 | |
| Process I | 83 | 22 | 890 | |
| Process J | 54 | 17 | 901 | |

Process Memory Information retrieved in step 3

*FIG. 2D*

ADAPTIVE MEMORY OPTIMIZATION FOR THIN CLIENTS

CROSS-REFERENCE TO RELATED APPLICATIONS

N/A

BACKGROUND

Operating systems, such as Windows, provide functionality for preventing the content of a storage medium from being changed. In a typical example, it may be desirable to prevent the operating system image, which may be stored on a particular disk partition or on flash media, from being changed at runtime. For example, Windows 10 provides the Unified Write Filter (UWF) which can be used to redirect all writes that target the operating system image to an overlay that is typically implemented in RAM. This overlay stores changes made to the operating system at runtime but is removed when the user device is restarted thereby restoring the user device to its original state.

Thin clients oftentimes employ a write filter to minimize the number of writes that are performed to their solid-state drives which in turn should prolong the life of the drives. For similar reasons, thin clients are typically configured to not employ paging files. In fact, in Windows 10, when the UWF is enabled, it disables paging files. Accordingly, due to the RAM-based overlay and the lack of paging files, memory consumption is relatively higher in thin clients. Yet, thin clients by design have a reduced amount of memory (e.g., 4 GB). Accordingly, it is more likely that a thin client with a write filter will run out of memory.

When a thin client runs out of memory, it will be forced to reboot leading to lost work, reduced productivity and user frustration. One possible solution to this problem would be to run applications that have a minimal memory footprint. Unfortunately, at least because of the prevalence of paging and the large amounts of memory that are available on non-thin clients, many applications are not designed to utilize minimal memory. Also, even if an application is designed to minimize its memory footprint, some tasks, such as rendering high-definition video and installing updates, require significant amounts of memory. In short, in common thin client configurations, the added memory consumption of a write filter's RAM-based overlay significantly reduces the amount of memory that will be available to other applications.

BRIEF SUMMARY

The present invention extends to methods, systems and computer program products for providing adaptive memory optimization. A memory optimizer service can be executed on a thin client or other user device to detect when low memory conditions exist. When it detects a low memory condition, the memory optimizer service can obtain process memory information for processes executing on the thin client and use the process memory information to calculate a trim amount to apply to the working set of processes with the highest amount of private bytes in their working sets. These trim amounts can be proportional to the amounts of private bytes and in sum can equal a total desired reduction in memory consumption.

In some embodiments, the present invention can be implemented by a memory optimizer service as a method for performing adaptive memory optimization. The memory optimizer service detects a low memory condition, and, in response, obtains process memory information that includes, for each of a plurality of processes, a size of a working set for the process and an amount of private bytes in the working set for the process. The memory optimizer service also identifies a subset of the plurality of processes. For each process in the subset, the memory optimizer service calculates a trim amount to apply to the working set of the process. The trim amount can be based on the amount of private bytes in the working set for the process. For each of at least some of the processes in the subset, the memory optimizer service causes the working set for the process to be reduced by the corresponding trim amount.

In some embodiments, the present invention is implemented as computer storage media that stores computer executable instructions that implement a memory optimizer service that performs adaptive memory optimization. The memory optimizer service can be configured to detect a low memory condition, and, in response, obtain process memory information that includes, for each of a first plurality of processes, a size of a working set for the process and an amount of private bytes in the working set for the process. The memory optimizer service may then identify processes that have higher amounts of private bytes than other processes in the first plurality of processes and may also identify a total desired reduction in memory consumption. The memory optimizer service can calculate trim amounts to apply to the working sets of the identified processes to achieve the total desired reduction in memory consumption. Each trim amount can be proportional to the amount of private bytes in the working set for the corresponding process. The memory optimizer service can then cause the working set of each identified process to be reduced by the corresponding trim amount.

In some embodiments, the present invention can be implemented as a thin client that includes one or more processors, one or more disks, memory and a memory optimizer service that is configured to be loaded in the memory and executed by the one or more processors to implement a method for performing adaptive memory optimization. This method can include: registering to receive events indicative of low memory conditions; and in response to each event indicative of a low memory condition: obtaining process memory information that includes, for each of a plurality of processes, a size of a working set for the process and an amount of private bytes in the working set for the process; identifying a subset of the plurality of processes; for each process in the subset, calculating a trim amount to apply to the working set of the process, the trim amount being based on the amount of private bytes in the working set for the process; and causing the working set for the process to be reduced by the corresponding trim amount.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which:

FIGS. 2A-2E illustrate how a memory optimizer service can perform adaptive memory optimization in accordance with embodiments of the present invention.

DETAILED DESCRIPTION

In this specification and the claims, the term "user device" should be construed as any computing device that is capable of executing a write filter. A user device would therefore include desktops, laptops, tablets, thin clients, smart phones, etc. Embodiments of the present invention will be described in the context of a thin client. However, the present invention can be implemented on any user device. The term "write filter" should be construed as encompassing any driver or other component that functions as a filter to prevent content of a protected volume from being modified. Although embodiments of the present invention may typically be implemented on thin clients with write filters that consume significant amounts of memory, the present invention could also be implemented on user devices that do not employ write filters.

Figure 1:
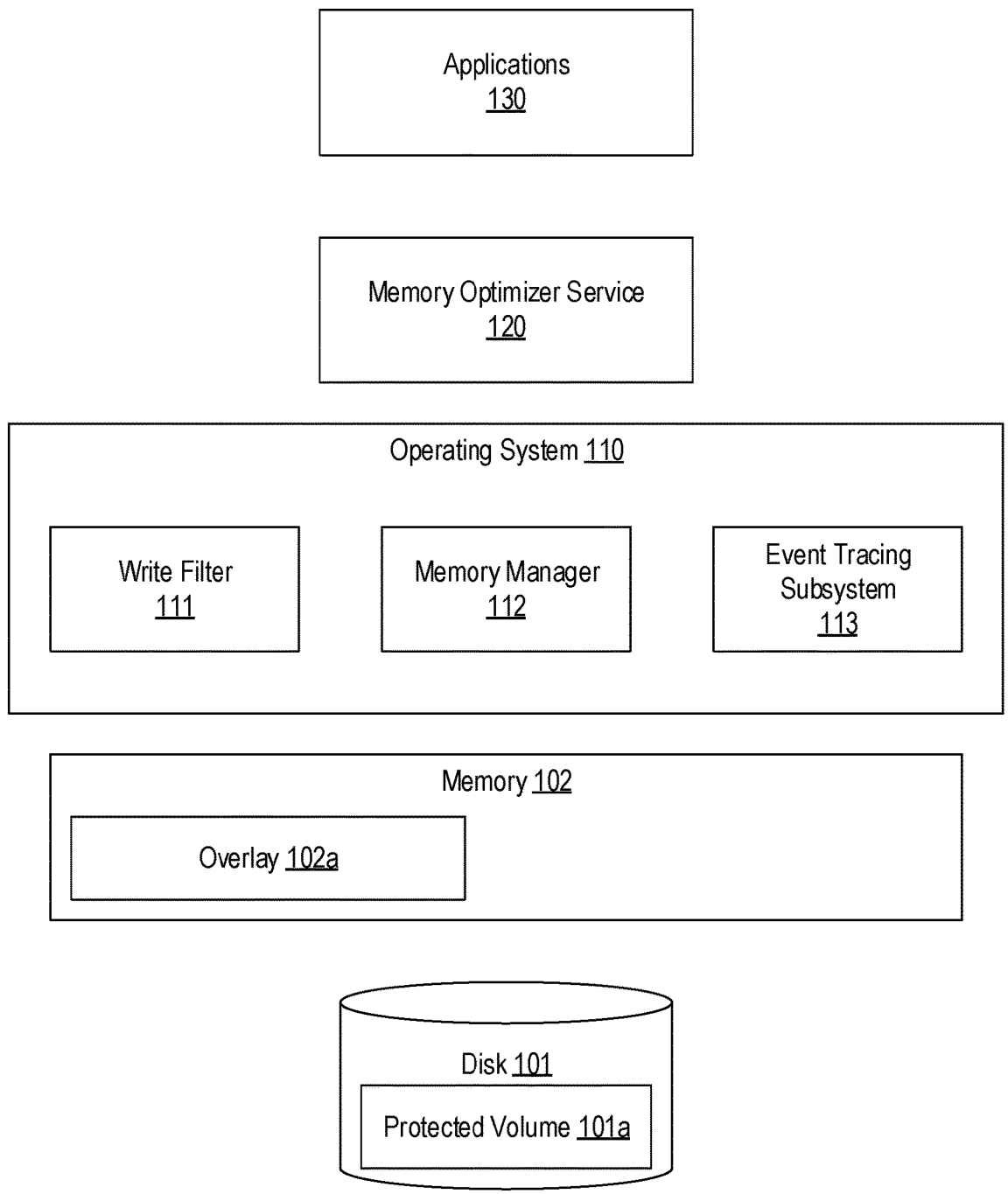
FIG. 1 illustrates various components of a thin client architecture that may be involved in implementations of the present invention.

FIG. 1 illustrates various components of a thin client that may be involved in implementations of the present invention. These components include hardware components such as disk(s) 101 and memory 102 and software components such as an operating system 110, a memory optimizer service 120 and applications 130. By way of example only, operating system 110 could be a version of Windows 10 such as Windows 10 IoT that is commonly installed on thin clients. Operating system 110 can include a write filter 111 (e.g., the UWF) that is configured to employ a RAM-based overlay 102a to protect the content of a protected volume 101a. However, in some embodiments, write filter 111 may be a third party component rather than a component of operating system 110.

Operating system 110 also includes memory manager 112 that can represent the component(s) of operating system 110 that manage memory 102. Of primary relevance to the present invention, memory manager 112 can provide functionality for identifying and reducing the memory utilization of processes. Operating system 110 can also include event tracing subsystem 113 that can represent the component(s) of operating system 110 that enable events to be provided and consumed. When operating system 110 is a version of Windows 10, event tracking subsystem 113 can represent Event Tracing for Windows (ETW).

Memory optimizer service 120 can be configured to leverage functionality of memory manager 112 and event tracking subsystem 113 to provide adaptive memory optimization. As an overview, memory optimizer service 120 can interface with event tracing subsystem 112 to be notified of or otherwise detect when a low memory condition exists. Given that the size of overlay 102a is fixed, a low memory condition will occur as processes of applications 130 (or processes of other components such as services of operating system 110) consume memory 102. In response to identifying a low memory condition, memory optimizer service 120 can interface with memory manager 111 to obtain memory utilization information of current processes, use such information to determine how to reduce overall memory utilization, and then interface with memory manager 112 to implement the reductions.

Figure 2A:
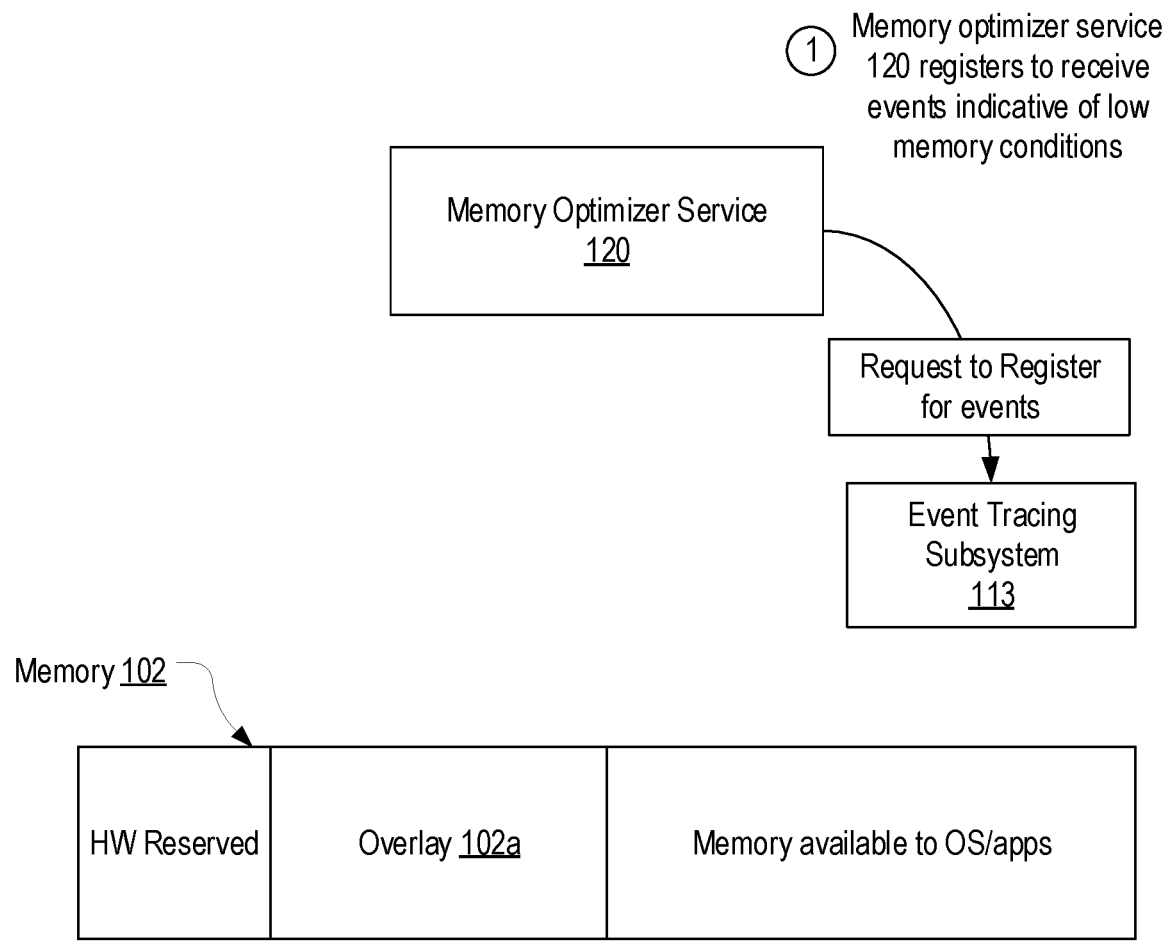

FIGS. 2A-2E represent how memory optimizer service 120 may implement adaptive memory optimization. FIG. 2A may represent the state of thin client 100 shortly after thin client 100 is booted. In particular, a portion of memory 102 has been reserved for hardware while another portion has been dedicated to overlay 102a (e.g., in the form of a RAM disk) with the remaining memory being available to operating system 110 and applications 130. It is noted that overlay 102a may be configured to dynamically expand (e.g., up to 1 GB) such that the total amount of memory available to operating system 110 and applications 130 would decrease over time as the consumption of overlay 102a increases. For simplicity, however, the figures will depict overlay 102a with a fixed size.

Memory optimizer service 120 can be configured to load at startup and, as part of loading and as represented as step 1, register with event tracing subsystem 113 to be notified when low memory conditions occur. A "low memory condition" should be construed as an instance where the amount of free memory has dropped below a threshold. Memory optimizer service 120 can be configured to detect a low memory condition based on particular events that event tracing subsystem 113 may report. Specific, but non-limiting, examples of such events include event ID 2004 that is provided by the Resource-Exhaustion-Detector event provider when the available virtual memory drops below a threshold, event ID 3 that is provided by the Microsoft-Windows-WUSA event provider when there is insufficient memory to install an update, the PerfInfoPMCSample event (which is available within the Microsoft.Diagnostics.Tracing.TraceEvent .Net library) which is raised when a sample of a performance counter is available, etc.

In some Windows-based implementations, memory optimizer service 120 may register for particular types of events by initializing an EVENT_TRACE_LOGFILE structure to identify a trace session and to provide one or more callback functions that event tracing subsystem 113 will call when events occur within the trace session, calling the OpenTrace function with the EVENT_TRACE_LOGFILE structure as input to obtain a handle to the corresponding trace session and then calling the ProcessTrace function with the handle as input to cause event tracing subsystem 113 to commence providing events that occur in the trace session to memory optimizer service 120. As another example, memory optimizer service 120 could register to periodically receive samples from the \Memory\Available Bytes performance counter (e.g., via the PerfInfoPMCSample event) to thereby detect the amount of free memory that currently exists. It is noted that, in some embodiments, memory optimizer service 120 could be configured to retrieve samples from the \Memory\Available Bytes (or similar) performance counter without interfacing with ETW, and therefore, in such embodiments, event tracking subsystem 113 should be viewed as encompassing the components from which memory optimizer service 120 obtains such samples (e.g., the Performance Data Helper (PDH) interface). In short, there are many different ways that memory optimizer service 120 could determine when low memory conditions have occurred.

Figure 2B:
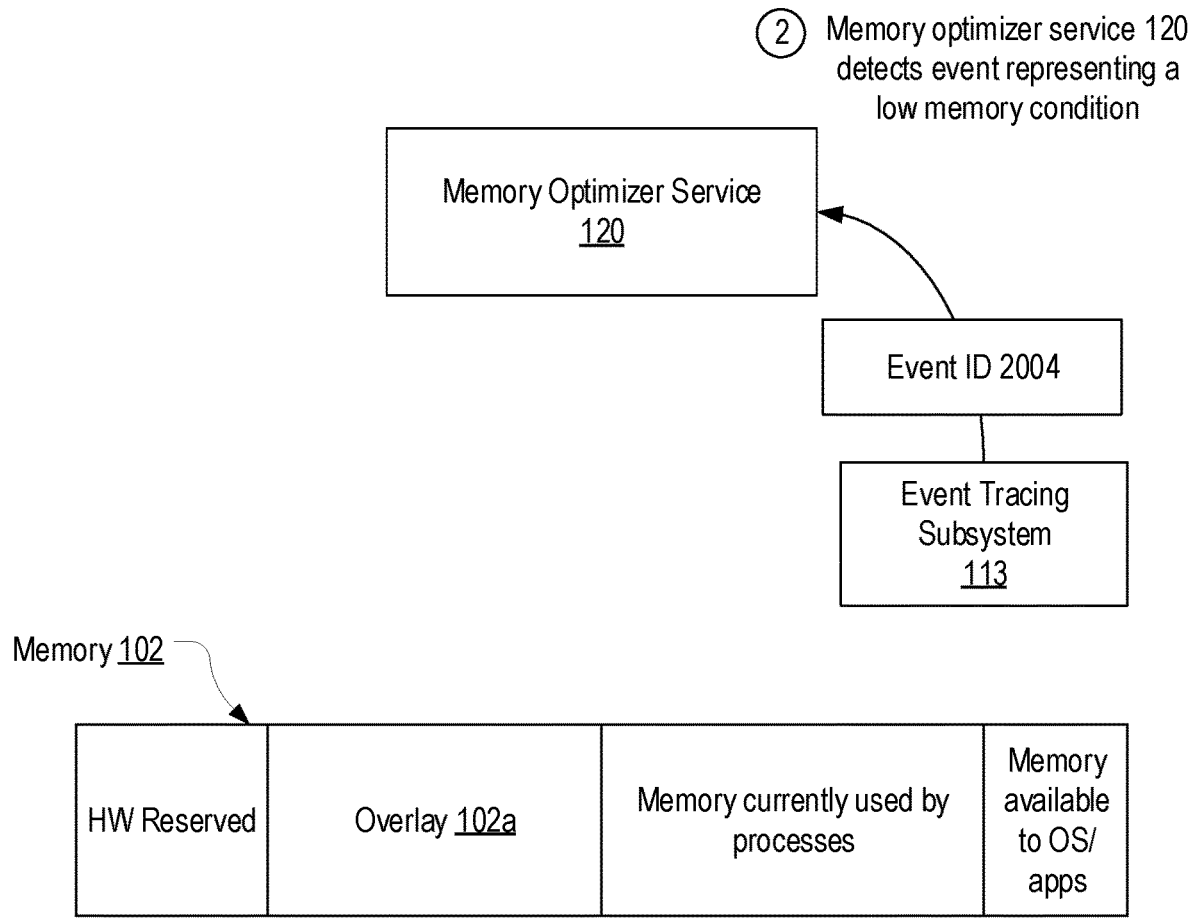

Turning to FIG. 2B, it is assumed that the execution of one or more processes have caused the amount of available memory to drop below a threshold. As a result, in step 2, memory optimizer service 120 is notified of an event representing a low memory condition. In this example, it is assumed that the Resource-Exhaustion-Detector event provider has generated an event with an ID of 2004 and that event tracing subsystem 113 has provided this event to memory optimizer service 120 due to the registration performed in step 1. Step 2 should be viewed as encompassing instances where memory optimizer service 120 receives other events such as instances where memory optimizer service 120 receives a sample from the \Memory\Available Bytes performance counter and determines that the available bytes of memory is below a threshold. Furthermore, step 2 should be viewed as including the processing of a received event to determine that it represents a low memory condition as opposed to some other occurrence.

Figure 2C:
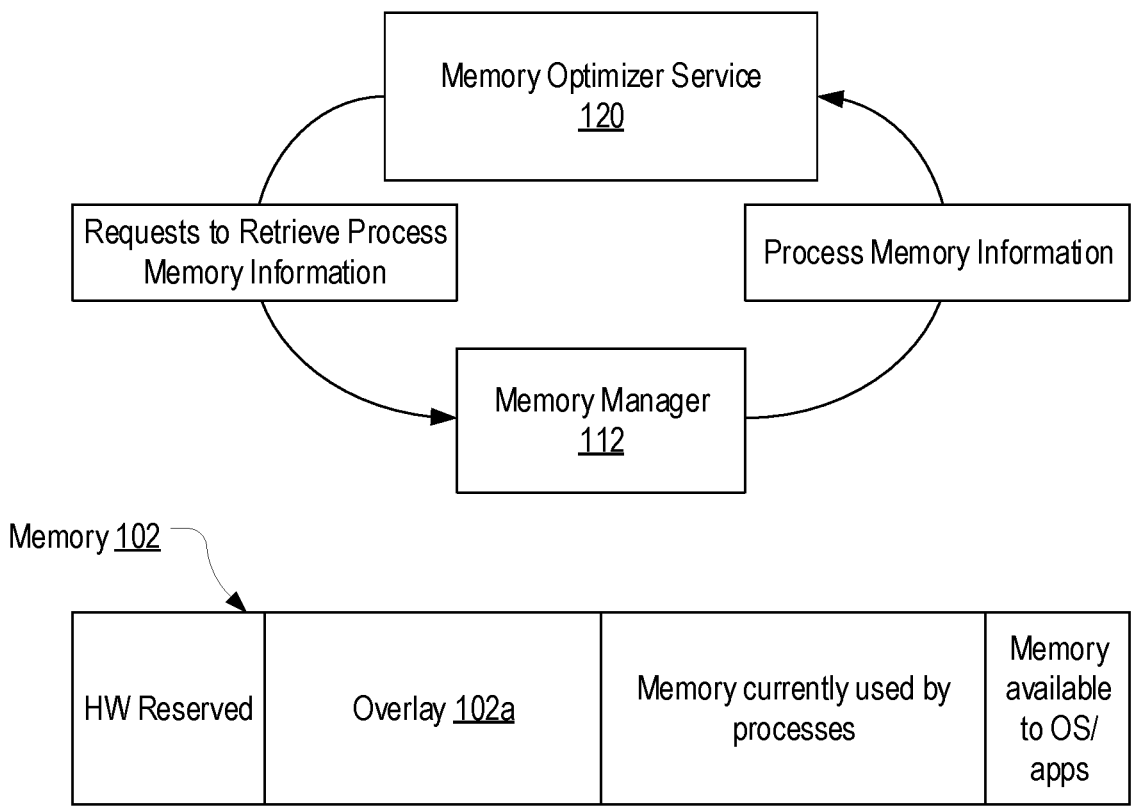

In response to detecting the occurrence of a low memory condition, in step 3 shown in FIG. 2C, memory optimizer service 120 can retrieve memory information for each running process. As one example only, memory optimizer service 120 may first enumerate each process (e.g., by calling the EnumProcesses function to obtain an array of process identifiers for the processes), obtain a handle to each enumerated process (e.g., by calling the OpenProcess function for each retrieved process identifier) and then request memory information for each process (e.g., by calling the GetProcessMemoryInfo function using the handle for each process). Memory optimizer service 120 may receive the memory information in the form of a PROCESS_MEMORY_COUNTERS_EX structure for each process. Among other information, these structures define the working set of the process (i.e., the amount of memory that is physically mapped to the process which may be defined in the WorkingSetSize member) and the private bytes in the working set (i.e., the portion of the working set that is not shared with any other process which may be defined in the PrivateUsage member). Although the working set represents the amount of memory that is mapped to a process, this metric typically encompasses shared resources (e.g., DLLs).

In step 4a which is represented in FIG. 2D, memory optimizer service 120 can use the process memory information it retrieved in step 3 to identify which processes have the highest consumption of private bytes. Notably, the processes with the highest consumption of private bytes need not be the same as the processes with the largest working sets. In FIG. 2D it is assumed that memory optimizer service 120 is configured to identify the top five consumers of private bytes which are Processes A, C, D, E and F. This could be accomplished by identifying the five highest values of the PrivateUsage member in the various PROCESS_MEMORY_COUNTERS_EX structures that memory optimizer service 120 received in step 3. Of course, memory optimizer service 120 could identify the top 4, the top 6 or some other number of the top consumers of private bytes.

In step 4b, memory optimizer service 120 can use the memory information for the processes identified in step 4a to calculate a trim amount to be applied to the working set of each identified process. In some embodiments, memory optimizer service 120 can employ the following "trim amount equation" to calculate these trim amounts:

$$X(p_n) = \frac{PBC(p_n) * T}{\sum_{1}^{n} PBC(p_n)}$$

where $X(p_n)$ is the trim amount to apply to the working set of the process, $PBC(p_n)$ is the private bytes for the process that are under consideration, n is the number of processes identified in step 4a, $\Sigma_1^n PBC(p_n)$ is the sum of the private bytes under consideration of each identified process and T is the total desired reduction in memory consumption. The value of T can be set to a relatively small value (e.g., 100 MB) so that the memory consumption is reduced in small increments until the low memory condition is resolved. The private bytes under consideration can be a scaled amount (e.g., 90%) of the process's private bytes (e.g., $PBC(p_n)$=PB$(p_n)$*S, where $PB(p_n)$ is the process's private bytes and S is the scaling value). The reason for this scaling will be explained below. Accordingly, memory optimizer service 120 identifies a number of processes that are consuming the most private bytes and then calculates trim amounts for each of the identified processes that in sum will yield a reduction in memory consumption of T MB.

To provide an example using the numbers from FIG. 2D, a value of 100 MB for T and a 90% scaling value, the sum of private bytes ($\Sigma_1^n PBC(p_n)$) is 2,520. The trim amounts shown in FIG. 2D are then obtained by dividing the private bytes under consideration of each identified process by 2,520 and then multiplying by 100. For example, the trim amount for Process A would be (350*0.9*100)/2,520=12.5. Notably, the sum of the five trim amounts is 100 MB. In other words, the trim amount equation spreads the 100 MB reduction across the five processes using trim amounts that are proportional to each process's private byte consumption.

Memory optimizer service 120 can utilize the private bytes under consideration (i.e., the scaled value of the process's private bytes) to prevent the working set of an identified process from being trimmed excessively. In particular, memory optimizer service 120 may employ the following "trim amount validator equation" to determine whether a calculated trim amount should be applied to the working set of the identified process:

if $WS(p_n)-X(p_n)>=(WS(p_n)-PBC(p_n))(1+(1-S))$ where $WS(p_n)$ is the size of the working set of the identified process, $X(p_n)$ is the trim amount calculated for the identified process as described above and S is the scaling value used to calculate the private bytes under consideration. In other words, the trim amount validator equation detects instances where the calculated trim amount approximates the process's private bytes. If this equation yields true (i.e., if the calculated trim amount does not approximate the process's private bytes), the calculated trim amount can be applied to the working set of the identified process. Otherwise, the calculated trim amount can be distributed to the other identified processes to thereby prevent a scenario where a high percentage of the process's private bytes may be trimmed from the working set.

To provide an example of how a calculated trim amount can be distributed to the other identified processes, it can be assumed that the trim amount validator equation yields false for Process A (although it does not based on the number in FIG. 2D). Based on this assumption, memory optimizer service 120 could distribute the 12.5 MB trim amount calculated for Process A to the trim amounts calculated for the other four processes (e.g., by adding 3.125 MB to each trim amount, by adding a percentage of the 12.5 MB proportional to each trim amount or by some other technique).

Figure 2E:
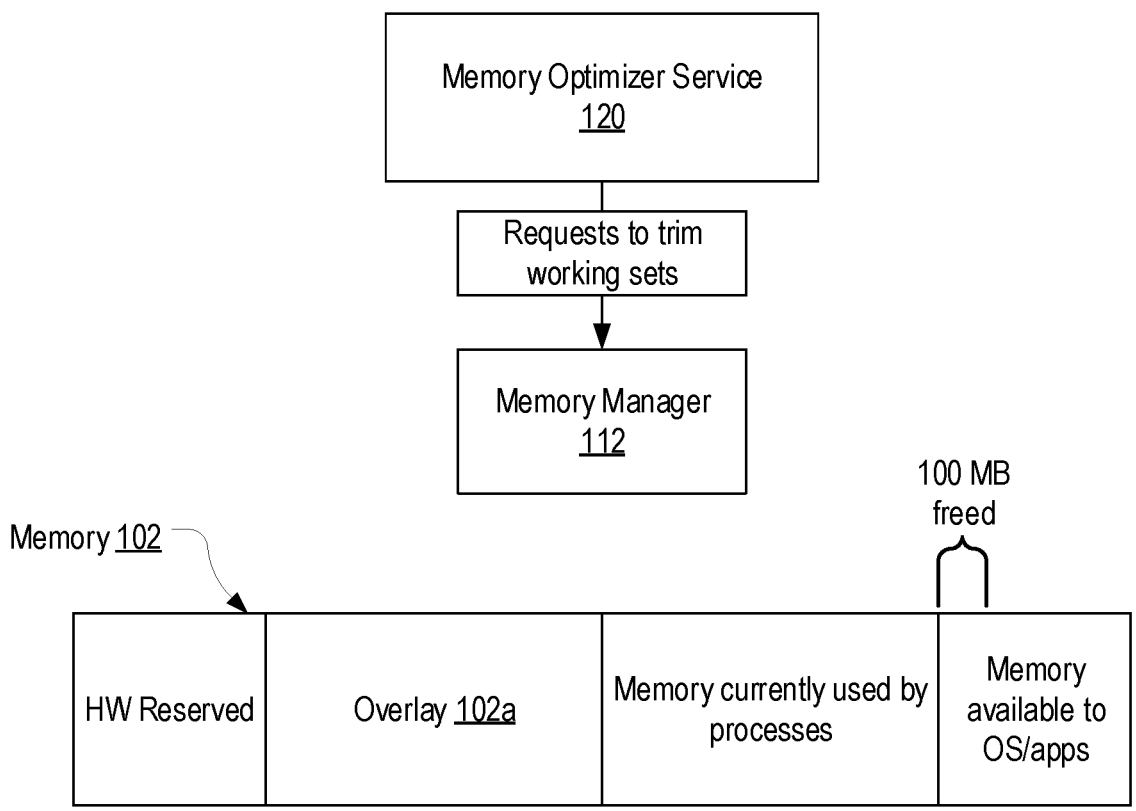

Turning to FIG. 2E, with the trim amounts calculated and in step 5, memory optimizer service 120 can generate and submit requests to memory manager 112 to cause the working sets of the identified processes to be reduced by the calculated trim amounts. In some embodiments, memory optimizer service 120 could accomplish this for each identified process by obtaining a handle to the identified process (e.g., by calling the OpenProcess function and specifying the process identifier and the PROCESS_ALL_ACCESS flag), creating a job object and associating the process with the job object (e.g., by calling the CreateJobObject function to obtain a handle to the job object and then calling the AssignProcessToJobObject function with the handles to the job object and the identified process as inputs) and then using the job object to define the working set size for the identified process (e.g., by creating a JOBOBJECT_BASIC_LIMIT_INFORMATION structure with the MaximumWorkingSetSize member set to $WS(p_n)-X(p_n)$ and then calling the SetInformationJobObject function with the handle to the job object and a pointer to the JOBOBJECT_BASIC_LIMIT_INFORMATION structure as inputs).

As a result of memory optimizer service 120 submitting these requests, memory manager 112 will reduce the size of the working set for each identified process by the calculated trim amount thereby freeing up 100 MB of memory. Notably, if freeing up 100 MB of memory does not resolve the low memory condition, memory optimizer service 120 will subsequently receive an event indicative of a low memory condition and can repeat the process (i.e., steps 3-5) to free up another 100 MB. Also notably, the reduction in the working sets of processes typically will not impact the performance of the processes since the reductions are made in small increments. However, in the unlikely scenario that repeated reductions reduces a working set or sets too significantly, memory optimizer service 120 could prompt the end user to reboot the thin client. Furthermore, even though a reduction in the size of a process's working set may result in increased page swaps, memory manager 112 would perform these page swaps in memory 102 (based on the assumption that paging files are disabled due to the use of write filter 111), and therefore, this adaptive memory optimization will not result in increased writes to disk 101.

Implementations of this adaptive memory optimization have been tested against a number of scenarios that oftentimes create low memory conditions on a thin client. For example, without memory optimizer service 120, thin clients routinely experience low memory conditions (e.g., event 2004 is triggered by the Resource-Exhaustion-Detector event provider) within five minutes of opening multiple browser tabs. In contrast, with memory optimizer service 120 executing on the same thin clients with multiple browser tabs open, low memory conditions were not reproducible over a 24-hour period. Similarly, thin clients routinely experience low memory conditions (e.g., event 2004 is triggered by the Resource-Exhaustion-Detector event provider) during video playback in a browser both when the browser is locally installed and when the browser is hosted on a server and multimedia redirection techniques are employed. With memory optimizer service 120 executing on these thin clients during video playback, low memory conditions were not reproducible over a 24-hour period. As another example, security updates to operating system 110 routinely fail on thin clients due to insufficient memory (e.g., event 3 is triggered by the Microsoft-Windows-WUSA event provider). However, with memory optimizer service 120 executing, these security updates installed successfully.

Figure 3:
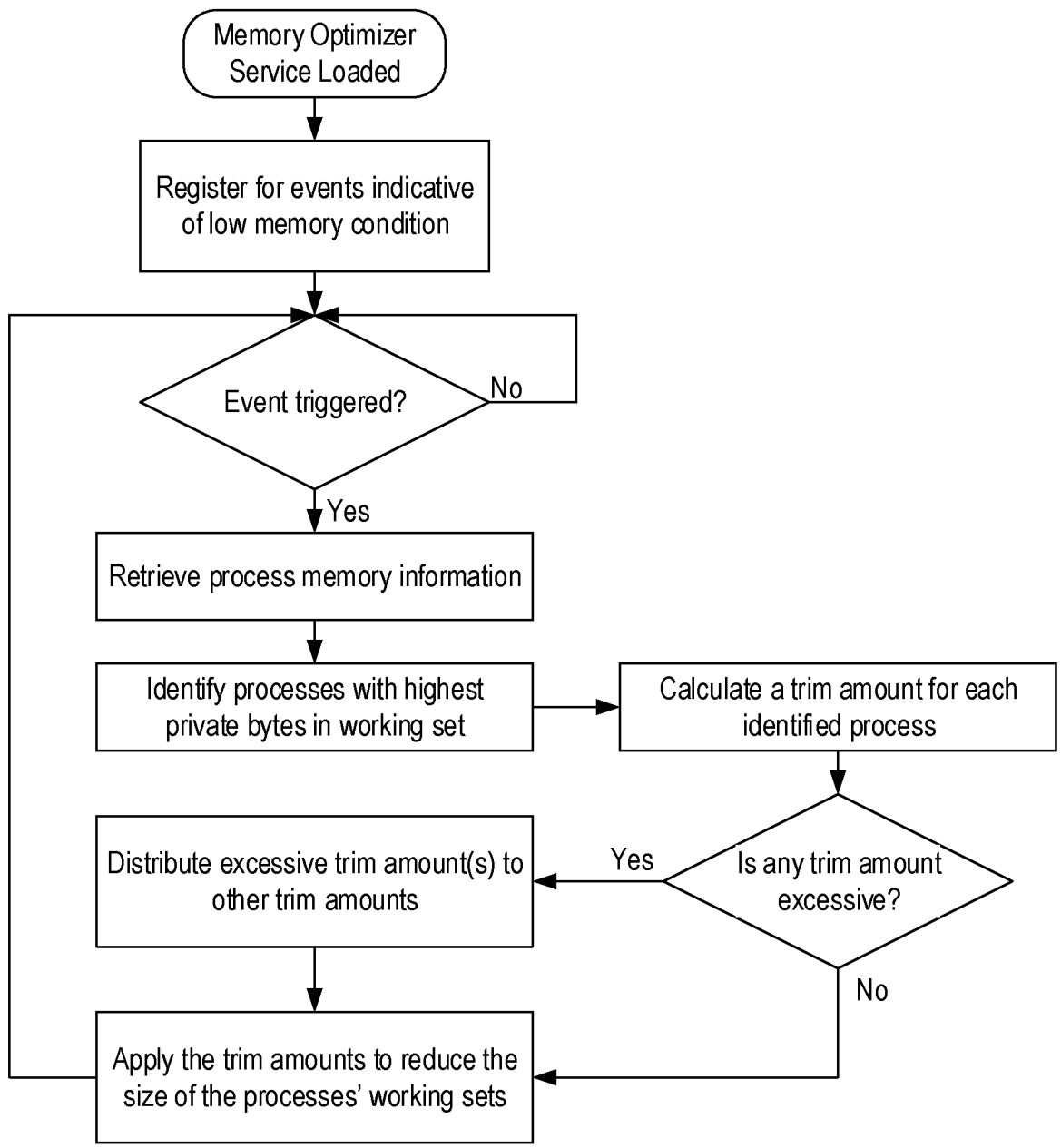
FIG. 3 provides a flow diagram of an example process that the memory optimizer service can employ to implement adaptive memory optimization in accordance with embodiments of the present invention.

FIG. 3 provides a flow diagram representing an example process by which memory optimizer service 120 may perform adaptive memory optimization. When memory optimizer service 120 is loaded, it can register for events indicative of low memory conditions and then wait for such events to occur. When an event indicative of a low memory condition is triggered, memory optimizer service 120 can retrieve process memory information such as a listing of the processes that are running (or at least some of the processes that are running), a size of the working set of each running process and the amount of private bytes in such working sets. Memory optimizer service 120 can then identify a number of processes that have the highest amount of private bytes and calculate a trim amount for the identified processes. The calculated trim amounts in sum can equal a desired amount of memory to be freed and each trim amount can be proportional to the amount of the corresponding process's private bytes. In some implementations, memory optimizer service 120 can determine if any of the calculated trim amounts are excessive and, if so, distribute the excessive trim amount(s) to the other trim amounts. Finally, memory optimizer service 120 can reduce the size of the processes' working sets by the trim amounts and return to monitoring for events indicative of a low memory condition.

In summary, embodiments of the present invention provide adaptive memory optimization that is particularly beneficial to thin clients that have limited memory due both to the smaller size of the physical memory and the write filter's RAM-based overlay. By executing memory optimizer service 120 on such thin clients, the functionality of the thin clients as well as the user experience is improved by minimizing and even eliminating the occurrence of low memory conditions and the reboots that would otherwise result. The adaptive memory optimization that memory optimizer service 120 performs ensures that low memory conditions are quickly resolved with minimal, if any, impact on the performance of other processes.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media is categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similar storage medium which can be used to store desired program code means in the form of computer-executable instructions or data structures and which can be accessed by a general purpose or special purpose computer. Transmission media include signals and carrier waves.

Computer-executable instructions comprise, for example, instructions and data which, when executed by a processor, cause a general purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method, implemented by a memory optimizer service that executes on a user device, for performing adaptive memory optimization, the method comprising:
   detecting a low memory condition on the user device;
   in response to detecting the low memory condition, obtaining process memory information that includes, for each of a plurality of processes executing on the user device, a size of a working set for the process and an amount of private bytes in the working set for the process;
   identifying a subset of the plurality of processes that have higher amounts of private bytes than other processes in the plurality of processes;
   for each process in the subset, calculating a trim amount to apply to the working set of the process, the trim amount being based on the amount of private bytes in the working set for the process; and
   for each of at least some of the processes in the subset, causing the working set for the process to be reduced by the corresponding trim amount.

2. The method of claim 1, wherein detecting a low memory condition comprises receiving an event indicative of the low memory condition.

3. The method of claim 2, further comprising:
   registering to receive events indicative of low memory conditions, wherein the event is received in response to registering.

4. The method of claim 1, wherein the amount of private bytes in the working set of each process in the subset is higher than the amount of private bytes in the working set of each process not in the subset.

5. The method of claim 4, wherein the subset includes five processes.

6. The method of claim 1, wherein the trim amount calculated for each process in the subset is proportional to the amount of private bytes in the working set for the process.

7. The method of claim 1, wherein the trim amount calculated for each process in the subset is proportional to a percentage of the amount of private bytes in the working set for the process.

8. The method of claim 1, wherein the memory optimizer service calculates the trim amounts such that a sum of the trim amounts equals a total desired reduction in memory consumption.

9. The method of claim 1, wherein the memory optimizer service causes the working set for each process in the subset to be reduced by the corresponding trim amount.

10. The method of claim 1, further comprising:
    determining that the trim amount calculated for a first process in the subset is excessive; and
    distributing the trim amount calculated for the first process to trim amounts calculated for other processes in the subset such that the memory optimizer service does not cause the working set for the first process to be reduced by the trim amount calculated for the first process.

11. The method of claim 1, wherein causing the working set for the process to be reduced by the corresponding trim amount comprises setting a maximum size of the working set for the process where the maximum size is equal to the size of the working set defined in the obtained process memory information minus the trim amount calculated for the process.

12. One or more computer storage media storing computer executable instructions which when executed on a user device implement a memory optimizer service that is configured to implement a method for performing adaptive memory optimization, the method comprising:
    detecting a low memory condition on the user device;
    in response to detecting the low memory condition, obtaining process memory information that includes, for each of a first plurality of processes executing on the user device, a size of a working set for the process and an amount of private bytes in the working set for the process;
    identifying processes that have higher amounts of private bytes than other processes in the first plurality of processes;
    identifying a total desired reduction in memory consumption;
    calculating trim amounts to apply to the working sets of the identified processes to achieve the total desired reduction in memory consumption, each trim amount being proportional to the amount of private bytes in the working set for the corresponding process; and
    causing the working set of each identified process to be reduced by the corresponding trim amount.

13. The computer storage media of claim 12, wherein the method further comprises:
    detecting an additional low memory condition;
    in response to detecting the additional low memory condition, obtaining additional process memory information that includes, for each of a second plurality of processes, a size of a working set for the process and an amount of private bytes in the working set for the process;
    identifying processes that have higher amounts of private bytes than other processes in the second plurality of processes;
    calculating trim amounts to apply to the working sets of the identified processes from the second plurality of processes to achieve the total desired reduction in memory consumption, each trim amount being proportional to the amount of private bytes in the working set for the corresponding process; and
    causing the working set of each identified process from the second plurality of processes to be reduced by the corresponding trim amount.

14. The computer storage media of claim 12, wherein calculating trim amounts to apply to the working sets of the identified processes to achieve the total desired reduction in memory consumption comprises calculating trim amounts that in sum equal the total desired reduction in memory consumption.

15. The computer storage media of claim 12, wherein detecting the low memory condition comprises:
   registering to receive events indicative of low memory conditions; and
   receiving an event indicative of the low memory condition.

16. The computer storage media of claim 12, wherein one of the identified processes is a browser executable.

17. The computer storage media of claim 12, wherein the method further comprises:
   detecting an additional low memory condition;
   in response to detecting the additional low memory condition, obtaining additional process memory information that includes, for each of a second plurality of processes, a size of a working set for the process and an amount of private bytes in the working set for the process;
   identifying processes that have higher amounts of private bytes than other processes in the second plurality of processes;
   calculating trim amounts to apply to the working sets of the identified processes from the second plurality of processes to achieve the total desired reduction in memory consumption, each trim amount being proportional to the amount of private bytes in the working set for the corresponding process;
   determining that the trim amount calculated for a first process is excessive;
   distributing the trim amount calculated for the first process to the trim amounts calculated for the other identified processes; and
   causing the working set of each identified process from the second plurality of processes, other than the first process, to be reduced by the corresponding trim amount.

18. A thin client comprising:
   one or more processors;
   one or more disks;
   memory; and
   a memory optimizer service that is configured to be loaded in the memory and executed by the one or more processors to implement a method for performing adaptive memory optimization, the method comprising:
   registering to receive events indicative of low memory conditions; and
   in response to each event indicative of a low memory condition:
      obtaining process memory information that includes, for each of a plurality of processes executing on the thin client, a size of a working set for the process and an amount of private bytes in the working set for the process;
      identifying a subset of the plurality of processes that have higher amounts of private bytes than other processes in the plurality of processes;
      for each process in the subset, calculating a trim amount to apply to the working set of the process, the trim amount being based on the amount of private bytes in the working set for the process; and
      causing the working set for the process to be reduced by the corresponding trim amount.

19. The thin client of claim 18, further comprising:
   a write filter.

20. The thin client of claim 18, wherein the memory optimizer service calculates the trim amounts such that a sum of the trim amounts matches a total desired reduction in memory consumption.

* * * * *